United States Patent
Knodt

(10) Patent No.: US 9,965,159 B2
(45) Date of Patent: May 8, 2018

(54) AUTOMATIC MEASUREMENT OF OBJECTS IN IMAGES

(71) Applicant: Kurt Knodt, Palo Alto, CA (US)

(72) Inventor: Kurt Knodt, Palo Alto, CA (US)

(73) Assignee: Ricoh Company, Ltd., Tokyo (JP)

(*) Notice: Subject to any disclaimer, the term of this patent is extended or adjusted under 35 U.S.C. 154(b) by 299 days.

(21) Appl. No.: 14/871,664

(22) Filed: Sep. 30, 2015

(65) Prior Publication Data

US 2017/0090730 A1    Mar. 30, 2017

(51) Int. Cl.
*G06F 3/048* (2013.01)
*G06F 3/0484* (2013.01)
*G06T 7/62* (2017.01)

(52) U.S. Cl.
CPC ...... *G06F 3/04845* (2013.01); *G06F 3/04842* (2013.01); *G06T 7/62* (2017.01); *G06T 2200/24* (2013.01); *G06T 2207/20092* (2013.01); *G06T 2207/30088* (2013.01)

(58) Field of Classification Search
CPC .... G06F 3/04845; G06F 3/04842; G06T 7/62
USPC ........................................................ 715/765
See application file for complete search history.

(56) References Cited

U.S. PATENT DOCUMENTS

| | | | | |
|---|---|---|---|---|
| 9,741,135 B2* | 8/2017 | Shen | ......................... | G06T 7/62 |
| 9,786,042 B2* | 10/2017 | Venkatesha | ........... | G06T 7/0004 |
| 2013/0262029 A1* | 10/2013 | Pershing | ................ | G06Q 10/06 |
| | | | | 702/156 |
| 2014/0314276 A1* | 10/2014 | Wexler | .................... | G06T 7/602 |
| | | | | 382/103 |
| 2014/0363065 A1* | 12/2014 | Taerum | .............. | A61B 5/02014 |
| | | | | 382/131 |
| 2015/0170378 A1* | 6/2015 | Moran | .................... | G06T 7/602 |
| | | | | 348/135 |
| 2016/0012611 A1* | 1/2016 | Wexler | .................... | G06T 7/602 |
| | | | | 382/103 |
| 2017/0090730 A1* | 3/2017 | Knodt | ................. | G06F 3/04842 |
| 2017/0284799 A1* | 10/2017 | Wexler | ..................... | G06T 7/62 |

FOREIGN PATENT DOCUMENTS

| | | |
|---|---|---|
| JP | 10-281728 | 10/1998 |
| WO | WO 2013/059599 A1 | 4/2013 |

OTHER PUBLICATIONS

European Patent Office, "Search Report" in application No. 16189568.5-1906, dated Feb. 24, 2017, 11 pages.

* cited by examiner

*Primary Examiner* — David Phantana-angkool
(74) *Attorney, Agent, or Firm* — Hickman Palermo Becker Bingham LLP; Edward A. Becker

(57) ABSTRACT

An approach is provided for measuring objects in images of scenes using measurement markers. An image editor retrieves and displays an image of a scene that includes an object of interest and a reference object having a known actual size in the scene in at least one dimension. A user of the image editor overlays a measurement marker on the object of interest in the displayed image. The image editor image editor determines a display size in the image editor of the at least one dimension of the reference object and a display size in the image editor of at least one dimension of the measurement marker. The image editor determines and displays an actual size in the scene of the at least one dimension of the measurement marker. Embodiments allow a user to adjust the scale of the reference object.

20 Claims, 11 Drawing Sheets

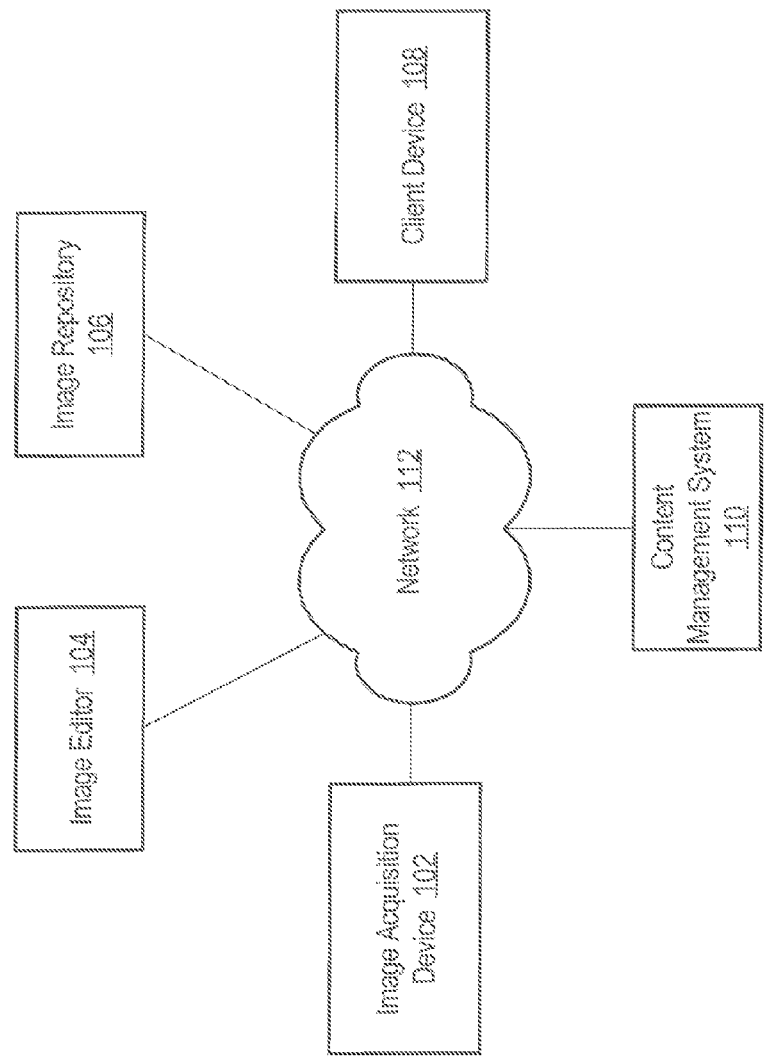

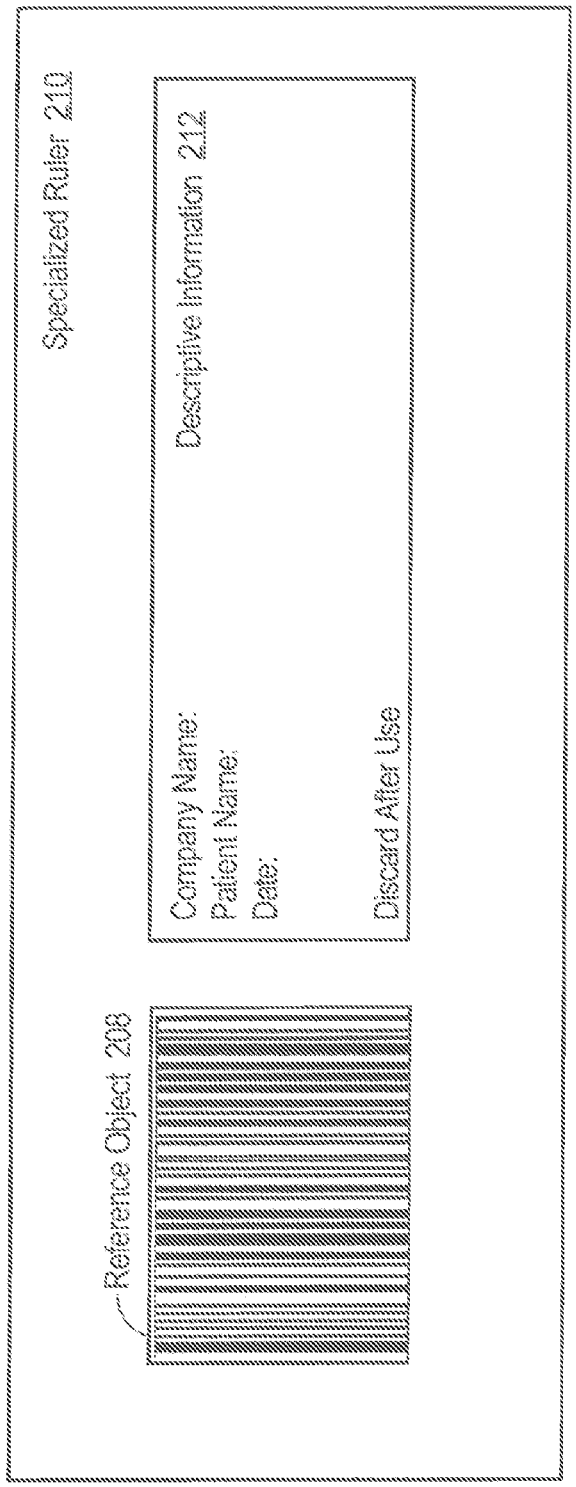

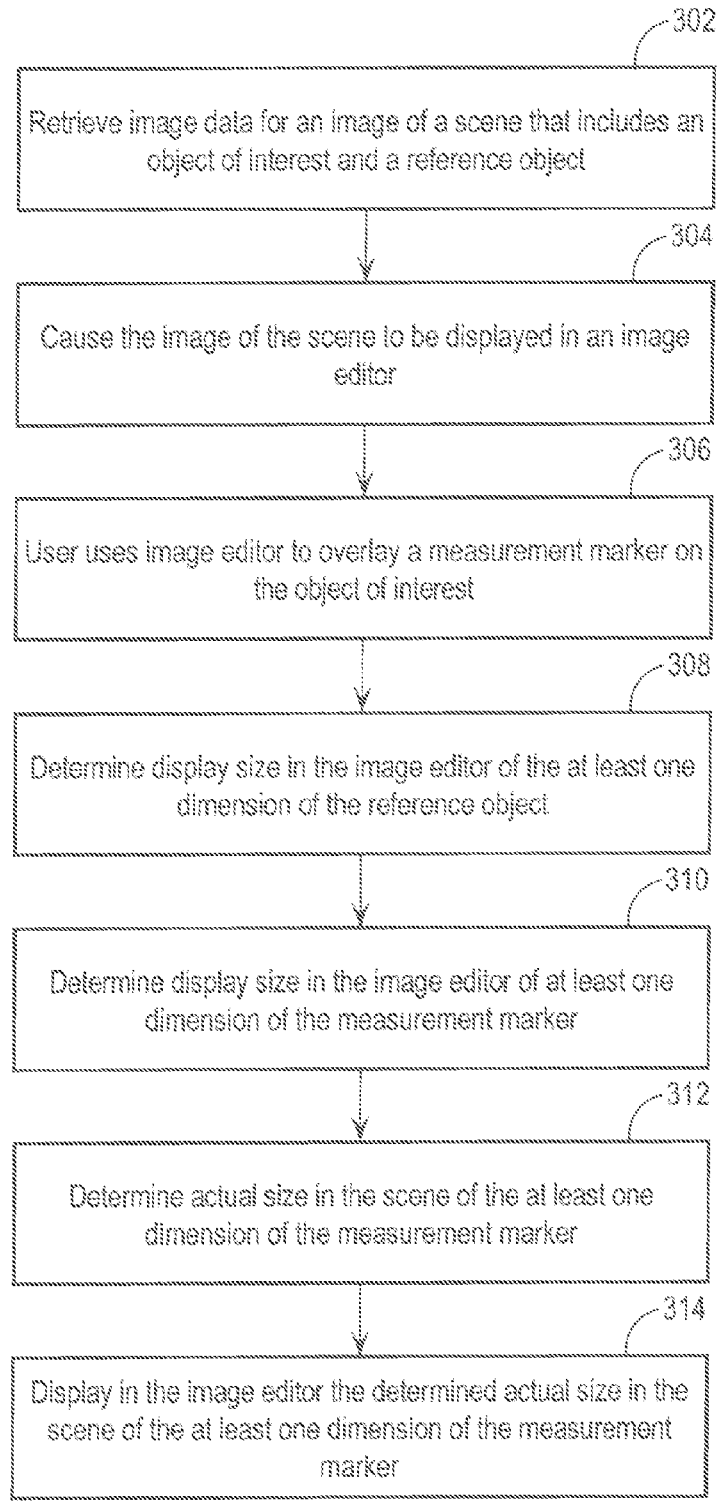

AUTOMATIC MEASUREMENT OF OBJECTS IN IMAGES

FIELD OF THE INVENTION

Embodiments relate generally to automatic measurement of objects in images.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Situations arise in which it is useful for a user to be able to measure the actual size of an object of interest in a scene captured in an image. For example, in the healthcare context, it is often important to be able to know the actual size of a wound more accurately than a visual approximation of a user. One conventional technique involves including a measuring tool, such as a ruler, adjacent the wound site so that after the image is acquired, a user may manually estimate the size of the wound based upon the measurement markings on the ruler. One disadvantage of this approach is that it does not provide an accurate measurement of the wound because the user must visually estimate the size of the wound based upon the ruler located in proximity to the wound and not on the wound itself. Another disadvantage of this approach is that it relies upon the skill of the clinician, which may vary significantly across different personnel, providing inconsistent measurements.

SUMMARY

An apparatus includes one or more processors and one or more memories communicatively coupled to the one or more processors and that store instructions. Processing of the instructions by the one or more processors causes image data to be retrieved for an image of a scene that includes an object of interest and a reference object having a known actual size in the scene in at least one dimension. The image of the scene that includes the object of interest and the reference object having a known actual size in the scene in at least one dimension are displayed in an image editor executing on the apparatus. In response to user input, a measurement marker is overlaid on the object of interest in the image editor and a display size in the image editor of the at least one dimension of the reference object is determined, along with a display size in the image editor of at least one dimension of the measurement marker. A determination is made of an actual size of the at least one dimension of the measurement marker in the scene based upon the display size in the image editor of at least one dimension of the measurement marker, the display size in the image editor of the at least one dimension of the reference object and the known actual size in the at least one dimension of the reference object in the scene. In the image editor, the determined actual size of the at least one dimension of the measurement marker in the scene is displayed.

BRIEF DESCRIPTION OF THE DRAWINGS

In the figures of the accompanying drawings like reference numerals refer to similar elements.

FIG. 1 is a block diagram that depicts an arrangement for measuring objects in images of scenes.

FIG. 2B depicts an example implementation of a reference object in the form of encoded data, such as a barcode, provided on a specialized ruler, along with descriptive information.

FIG. 3 is a flow diagram that depicts an approach for measuring objects in images.

DETAILED DESCRIPTION

Figure 2A:
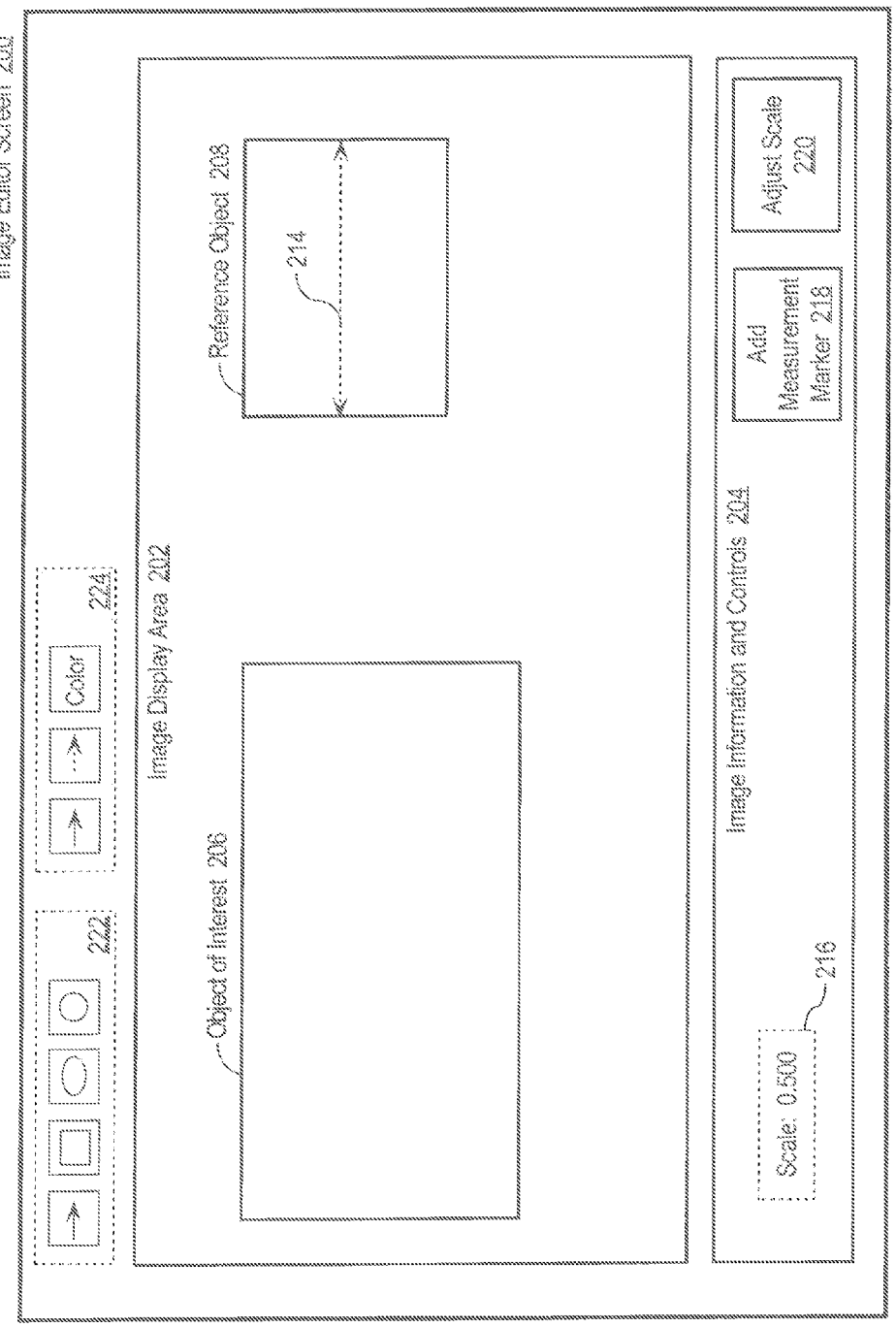
FIG. 2A depicts an example image editor screen generated by an image editor.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
  A. Overview
  B. Image Editor
III. MEASUREMENT OF OBJECTS IN IMAGES
  A. Overview
  B. Reference Objects
  C. Measurement markers
IV. SCALE ADJUSTMENT
V. IMPLEMENTATION MECHANISMS I. Overview An approach is provided for measuring objects in images of scenes using measurement markers. An image editor retrieves and displays an image of a scene that includes an object of interest and a reference object having a known actual size in the scene in at least one dimension. A user of the image editor overlays a measurement marker on the object of interest in the displayed image. The image editor image editor determines a display size in the image editor of the at least one dimension of the reference object and a display size in the image editor of at least one dimension of the measurement marker. The image editor determines and displays an actual size in the scene of the at least one dimension of the measurement marker based upon the display size in the image editor of at least one dimension of the measurement marker, the display size in the image editor of the at least one dimension of the reference object and the known actual size in the scene of the at least one dimension of the reference object. The approach allows users to quickly and easily measure the actual size of objects in a scene of an image. Embodiments allow a user to adjust the scale of the reference object.

II. System Architecture

FIG. 1 is a block diagram that depicts an arrangement 100 for measuring objects in images of scenes. The particular elements depicted in arrangement are not all required and embodiments are applicable to arrangement 100 having fewer elements or additional elements that may vary depending upon a particular implementation.

A. Overview

In the example depicted in FIG. 1, arrangement 100 includes an image acquisition device 102, an image editor 104, an image repository 106, a client device 108 and a content management system 110. Image acquisition device 102 may be implemented by any device that is configured to acquire images. Examples of image acquisition device 102 include, without limitation, a camera, a workstation, a personal computer, a laptop computer, a tablet computing device, a personal digital assistant, a smart phone, etc. Image editor 104 provides functionality for providing measurement of objects in images, as described in more detail hereinafter. Image repository 106 stores image data for images of scenes. The image data may be stored in any format or according to any structure that may vary depending upon a particular implementation. Image repository 106 may be implemented, for example, as a database with the image data organized in a particular manner, or the image data may be stored in an unstructured manner. Embodiments are not limited to the image data in image repository 106 being stored and/or organized in a particular manner.

Client device 108 may be any type of client device that is capable of interacting with image editor 104. Example implementations of client device 108 include, without limitation, a workstation, personal computer, laptop computer, tablet computing device, personal digital assistant, smart phone, an interactive whiteboard appliance, etc.

Content management system 110 may be any type of system that stores information. Examples of content management system 110 include, without limitation, traditional content management systems such as Microsoft SharePoint, Perceptive ImageNow, and Hyland OnBase, additionally, it may refer to EHR/EMR (Electronic Health Records/Electronic Medical Records) systems that store patient clinical information, such as Cerner Millenium, Epic EpicCare, or Siemens Soarian.

Network 112 is depicted in FIG. 1 as a single network for purposes of explanation only and network 112 may include any number and types of wired or wireless networks, such as local area networks (LANs), wide area networks (WANs), the Internet, etc. The various elements depicted in FIG. 1 may also communicate with each other via direct communications links that are not depicted in FIG. 1 for purposes of explanation.

B. Image Editor

Image editor 104 provides the functionality described herein for providing measurement of objects in images. Image editor 104 may be implemented in hardware, including circuits and/or special purpose computing devices that may include the use of one or more application-specific integrated circuits (ASICs) or field programmable gate arrays (FPGAs) that are persistently programmed to perform the techniques, computer software, or any combination of computer hardware and software. Example implementations of image editor 104 include, without limitations, a script-based process, such as a JavaScript process, and a client/server process. According to one embodiment, image editor 104 provides a graphical user interface that allows a user to measure objects of interest in images using measurement markers. The graphical user interface may be implemented via one or more Web pages.

Image editor 104 is depicted in the figures and described herein as embodied as a separate element, but this is done for purposes of explanation only and is not required. Image editor 104 may be implemented as a stand-alone process or as part of another process, such as a plug-in of another process. Image editor 104 may be implemented on any of the elements depicted in FIG. 1, for example, on image acquisition device 102, image repository 106, client device 108, content management system 110, or at other locations. Similarly, image repository 106 is depicted in the figures and described herein as embodied as a separate element, but this is done for purposes of explanation only and is not required. Image repository 106 may be implemented on any of the elements depicted in FIG. 1, for example, on image acquisition device 102, image editor 104, client device 108, content management system 110, or at other locations.

III. Measurement of Objects in Images

A. Overview

According to one embodiment, measurement of an object of interest in an image of a scene is provided by image editor 104 using a reference object and one or more measurement markers. FIG. 2A depicts an example image editor screen 200 generated by image editor 104. Image editor screen 200 may be generated and displayed by image editor 104 executing on client device 108. As another example, a user of client device 108 may request access to image editor 104 executing on a location external to client device 108. For example a user of client device 108 may use a Web browser to request a start Web page for image editor 104 and in response to the request, image editor 104 causes the start Web page to be provided to client device 108. Processing of the start Web page by the Web browser on the user's client device 108 provides a graphical user interface for image editor 104.

Image editor screen 200 includes an image display area 202 and image information and controls 204. Image display area 202 displays an image of a scene that includes an object of interest 206 and a reference object. The object of interest 206 is represented in the figures as a rectangle for purposes of explanation, but may represent any type of object of interest in a scene. For example, the object of interest may be a person, place or thing, of any shape or size, captured in the image.

B. Reference Objects

Figure 2C:
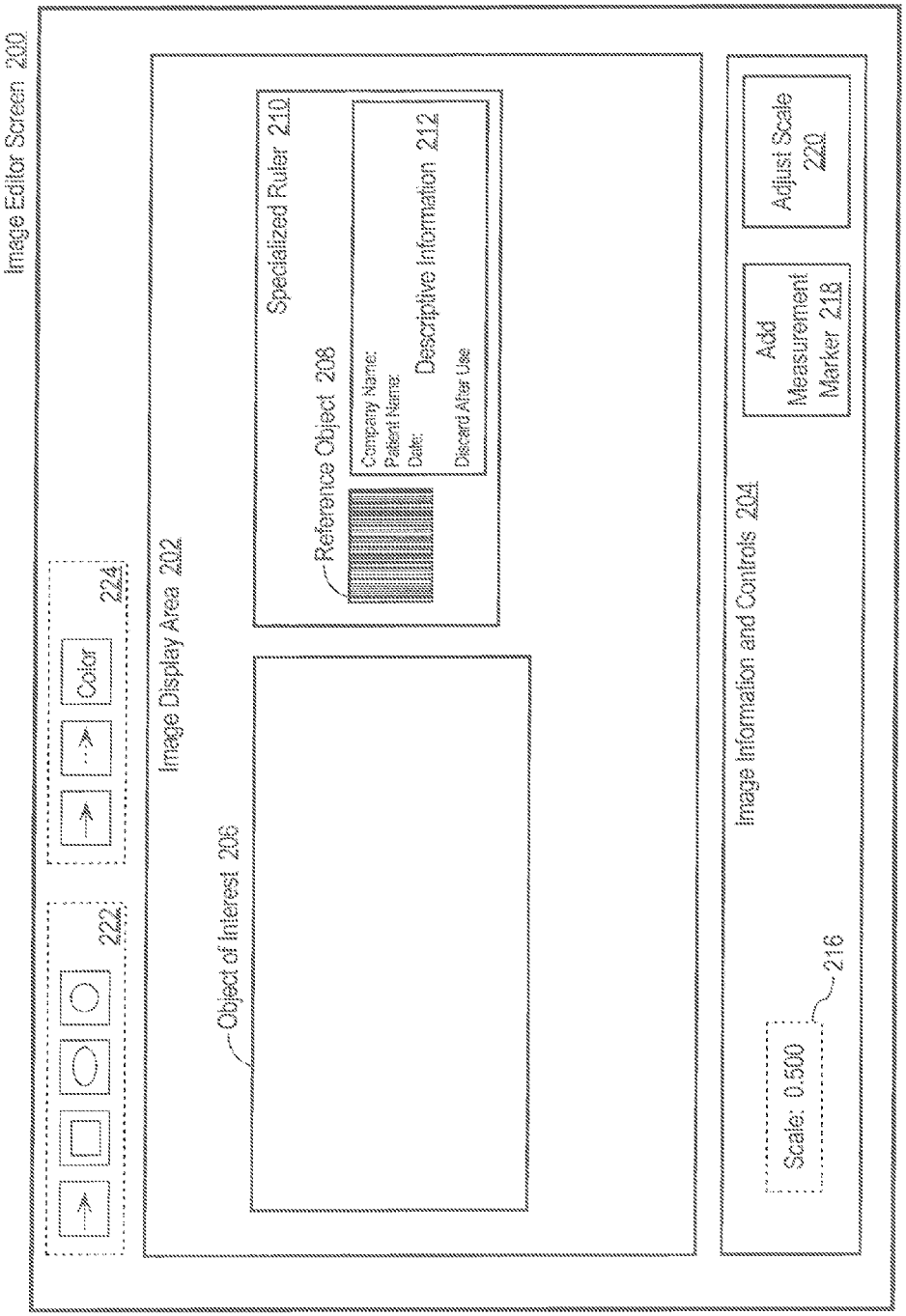
FIG. 2C depicts an image editor screen where the scene depicted in the image display area includes a specialized ruler.

The reference object 208 may be any type of object that is included in the scene with the object of interest 206. Examples of the reference object 208 include, without limitation, a two-dimensional object such as a paper or card, or a three-dimensional object such as a block or reference guide. FIG. 2B depicts an example implementation of reference object 208 in the form of encoded data, such as a barcode, provided on a specialized ruler 210, along with descriptive information 212. The descriptive information 212 may include information that is relevant to a particular implementation and/or use of the specialized ruler 210 and may be useful for particular workflows. For example, in a medical context, the descriptive information 212 may include a company name, a patient name, a date and a note to discard after use. Other information may be included, such as data identifying a person using the specialized ruler 210, such as healthcare personnel. The descriptive information 212 is not limited to any particular type of information and may include non-textual information, such as symbols, etc. The descriptive information 212 may be included with the encoded data, or may be separate, as depicted in FIG. 2B. Specialized ruler 210 may be implemented using any type of physical media, such as paper, card stock, cardboard, or other material, such as wood, metal, etc. One example embodiment of specialized ruler 210 in the medical context is a printed paper or card that may be placed adjacent a wound site to be measured. FIG. 2C depicts the image editor screen 200 where the scene depicted in the image display area 202 includes the specialized ruler 210.

According to one embodiment, the reference object 208 may be automatically detected in the image displayed in image display area 202. This may be accomplished by image editor 104 analyzing the image data for an image to detect one or more attributes or attribute values of the reference object 208. For example, reference objects 208 may have one or more attributes or attribute values that identify them as reference objects. Examples attributes include, without limitation, features, codes, signatures, any other type of specified data, or patterns of data or data values. According to one embodiment, reference objects may be visually identified to users of image editor 104. For example, a reference object may be displayed in image editor 104 using different visual attributes than other objects, such as color, other special effects, or a bounding box, so that the reference object is visually conspicuous to a user.

According to one embodiment, the reference object 208 has a known actual size in the scene in at least one dimension. In the example depicted in FIG. 2A, the known actual size of the reference object 208 is a width 214 of the reference object 208, although embodiments are not limited to the known actual size of the reference object 208 being a width 214 of the reference object 208. For example, the known actual size of the reference object 208 may be a height, or both a width and height, of the reference object 208. The known actual size of the reference object 208 may be stored with an image, for example, as part of the metadata for an image, or separately from the image. The known actual size of the reference object 208 may be part of the image itself, for example, included in the barcode implementation of the reference object 208 depicted in FIG. 2B.

According to one embodiment, image editor 104 is configured to determine a scale, or scale factor, for the reference object 208. The scale of the reference object is determined based upon a display size in the image editor 104 of the at least one dimension of the reference object 208 and the known actual size of the at least one dimension of the reference object in the scene. For example, suppose that the display width of the reference object 208 in image editor 104 is one inch. Suppose further that the known actual width 214 of the reference object 208 in the scene is two inches. In this example, the scale of the reference object 208, with respect to the width of the reference object, is 0.5 (½), and displayed on the image editor screen 200, as indicated by scale 216. The scale 216 may be expressed in any form, depending upon a particular implementation, and the scale 216 is not limited to any particular form. For example, the scale 216 may be expressed as a raw number, a percentage or a ratio, and may be accompanied by, or visually represented by one or more graphical user interface objects on image editor screen 200. Furthermore, the scale of the reference object 208 may be expressed as a ratio of the actual known size of dimension of the reference object in the scene and the display size in the image editor 104 of the at least one dimension of the reference object 208, which in the present example would result in a scale of 2.0.

C. Measurement Markers

According to one embodiment, image editor 104 includes functionality that allows a user to create and overlay measurement markers onto the object of interest 206 and have the actual size in the scene of at least one dimension of each measurement marker automatically determined and displayed in the image editor screen 200. This allows a user to quickly and easily determine one or more actual dimensions of the object of interest 206. As used herein and described in more detail hereinafter, the term "measurement marker" refers to a graphical user interface object that may be overlaid onto the object of interest 206 in the image editor screen 200. Any type of graphical user interface object may be used and embodiments are not limited to any particular type of graphical user interface object. Example graphical user interface objects that may be used as measurement markers include, without limitation, line segments, any type of polygons, circles, ovals, irregular shapes, custom shapes, etc. Display attributes for measurement markers may be specified to enhance the user experience. For example, the display attributes for a measurement marker may be selected so that the underlying object of interest is concurrently visible with the measurement marker. This allows a user to more easily visually align the measurement marker to the object of interest. As described in more detail hereinafter, one or both of the type of graphical user interface object to be used as a measurement marker and the display attributes of the measurement marker may be user selectable via image editor 104.

Referring again to FIG. 2A, image information and controls 204 includes an add measurement marker 218 control and an adjust scale 220 control. The adjust scale 220 control is described in more detail hereinafter. The add measurement marker 218 control allows a user to add a measurement marker onto the object of interest 206. Measurement marker type selection 222 controls allow a user to select a type of graphical user interface object to be used as a measurement marker. The depicted example types include a line segment, a rectangle, an oval and a circle, but these types are examples only and any type of graphical user interface object may be provided as a user-selectable option. Measurement marker attribute selection 224 controls allow a user to select one or more display attributes for measurement markers. The depicted example display attributes include solid lines, dashed lines and color selection, but these are provided as examples only and any type of display attributes may be provided as user-selectable options.

Figure 2D:
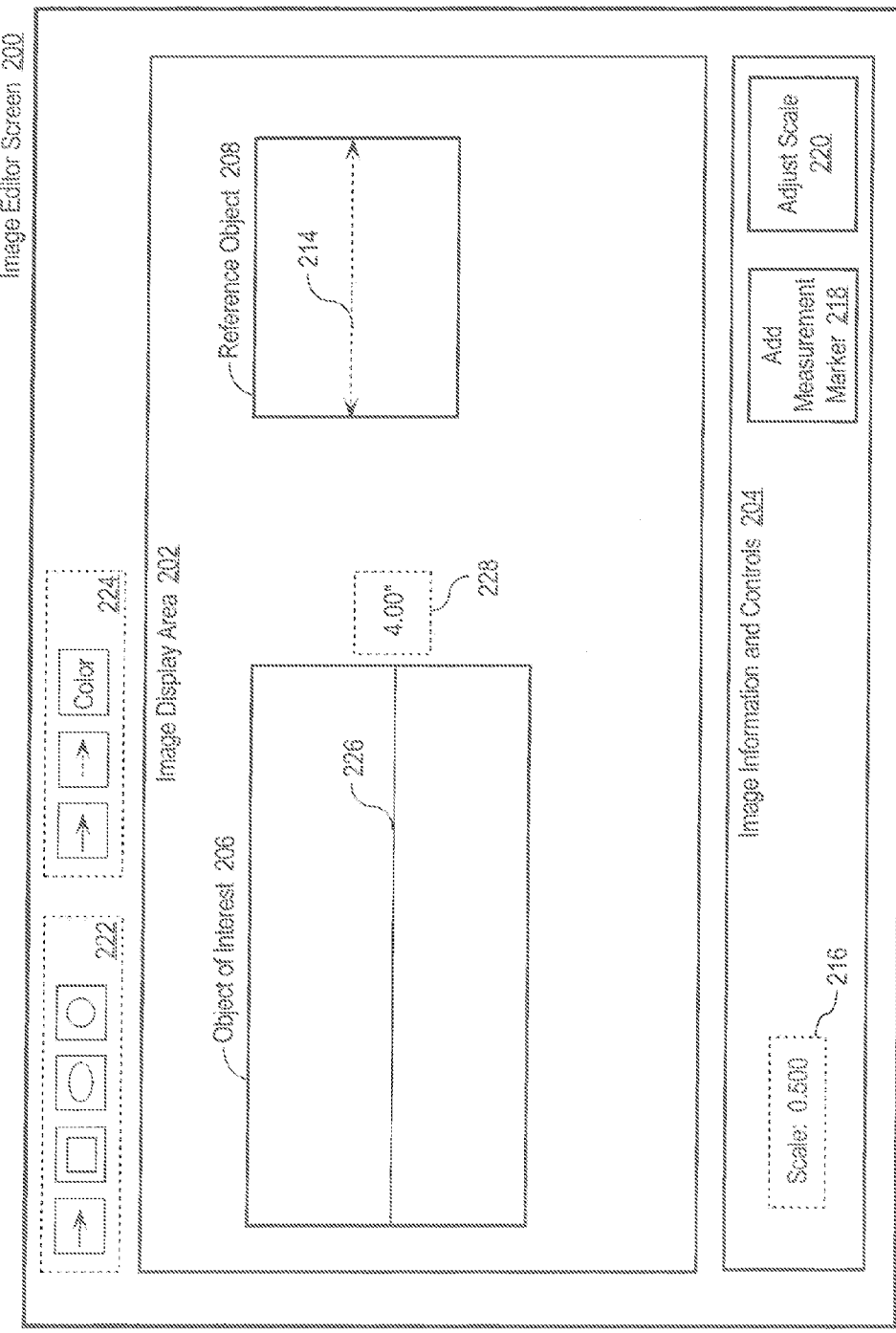
FIG. 2D depicts an image editor screen after a user has selected an add measurement marker control and added a measurement marker, in the form of a line segment, to an object of interest.

FIG. 2D depicts the image editor screen 200 after a user has selected the add measurement marker 218 control and added a measurement marker 226, in the form of a line segment, to the object of interest 206. Measurement markers may be drawn in image editor screen 200 using controls that are familiar to users of computer-implemented drawing software. For example, a user may use a pointing device, such as a mouse or trackball, to draw the measurement marker 226 on image editor screen 200.

According to one embodiment, after the measurement marker 226 is created, an actual size 228 in the scene of the measurement marker 226 is automatically calculated and displayed on the image editor screen 200. The actual size 228 in the scene of the measurement marker 226 is the actual size of at least one dimension of the measurement marker 226 in the scene captured in the image. The actual size 228 in the scene of the measurement marker 226 is determined based upon the display size in the image editor 104 of the measurement marker 226, the display size in the image editor of the reference object 208 and the known actual size in the scene of the reference object 208. According to one embodiment:

(1) Actual size in scene of measurement marker=(display size of measurement marker*actual size of reference object in the scene)/display size of reference object In the present example, suppose that the display size of the measurement marker 226 in the image editor 104 is two inches, the known actual width 214 in the scene of the reference object 208 is two inches and the display width of the reference object 208 in the image editor 104 is one inch. In this example, the actual size 228 in the scene of the measurement marker 226 is four inches ((2*2)/1). Alternatively, when the scale 216 of the reference object 208 is known, then the actual size in the scene of the measurement marker can be determined by:

(2) Actual size in scene of measurement marker=display size of measurement marker/scale of reference object The actual size 228 in the scene of the measurement marker 226 may be calculated and displayed after a user has created the measurement marker 226, for example, after a user has drawn the measurement marker 226 and released a mouse button or other control that was used to draw the measurement marker 226. The actual size 228 in the scene of the measurement marker 226 may also be dynamically calculated and displayed as the user creates the measurement marker 226 and may be updated any time that the user changes the measurement marker 226, for example, by shortening or lengthening the measurement marker 226 in FIG. 2D. This approach allows a user to create and visually align the measurement marker 226 with the object of interest 206 and immediately know the actual size in the scene of the object of interest 206. The actual size of the measurement marker 226 may be stored in association with the image, for example, in the metadata for the image in image repository 106. The actual size of the measurement marker 226 may also be transmitted to the content management system 110 for further processing. For example, data that specifies the actual size of the measurement marker 226 may be stored in content management system 110 with images of a patient, so that progress over time of a wound area may be evaluated.

Figure 2E:
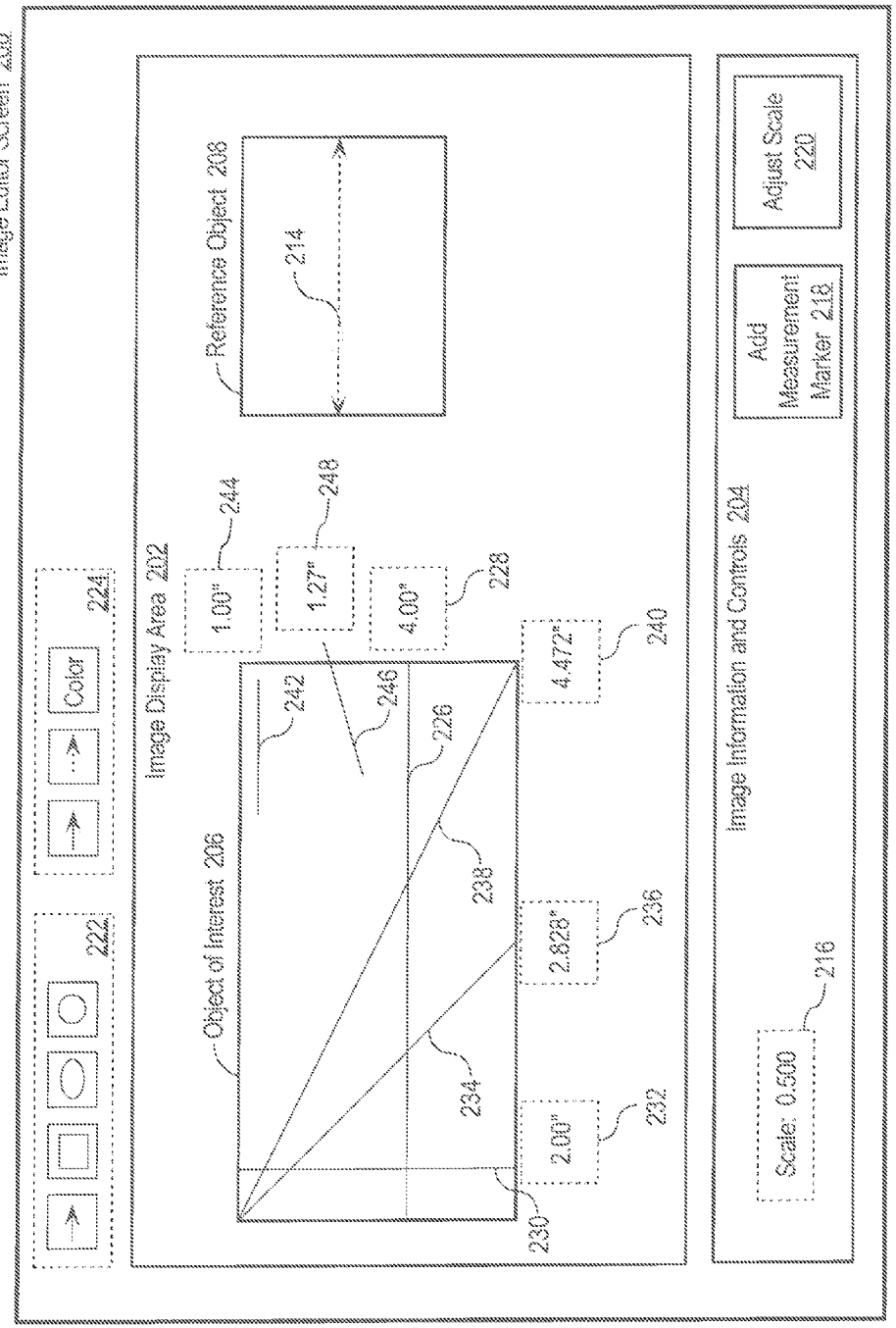
FIG. 2E depicts the use of multiple measurement markers to measure an object of interest.

According to one embodiment, multiple measurement markers may be used to provide more information about an object of interest. FIG. 2E depicts the use of multiple measurement markers to measure an object of interest. In addition to the measurement marker 226 depicted in FIG. 2D, in FIG. 2E, a user has created measurement markers 230, 234 and 238, having corresponding calculated and displayed actual sizes 232, 236, 240, respectively. As depicted in FIG. 2E, measurement markers are not limited to horizontal and vertical line segments and may be placed at any angle. In addition, measurement markers are not required to contact a periphery of an object of interest and may be placed internal or external to an object of interest, or may be both internal and external to an object of interest. For example, in FIG. 2E, a measurement marker 242 is created internal to the object of interest 206 and has a corresponding actual size 244. Measurement marker 246 is created both internal and external to the object of interest 206 and has a corresponding actual size 248. Thus, measurement markers may be created and overlaid in any location with respect to an object of interest.

Figure 2F:
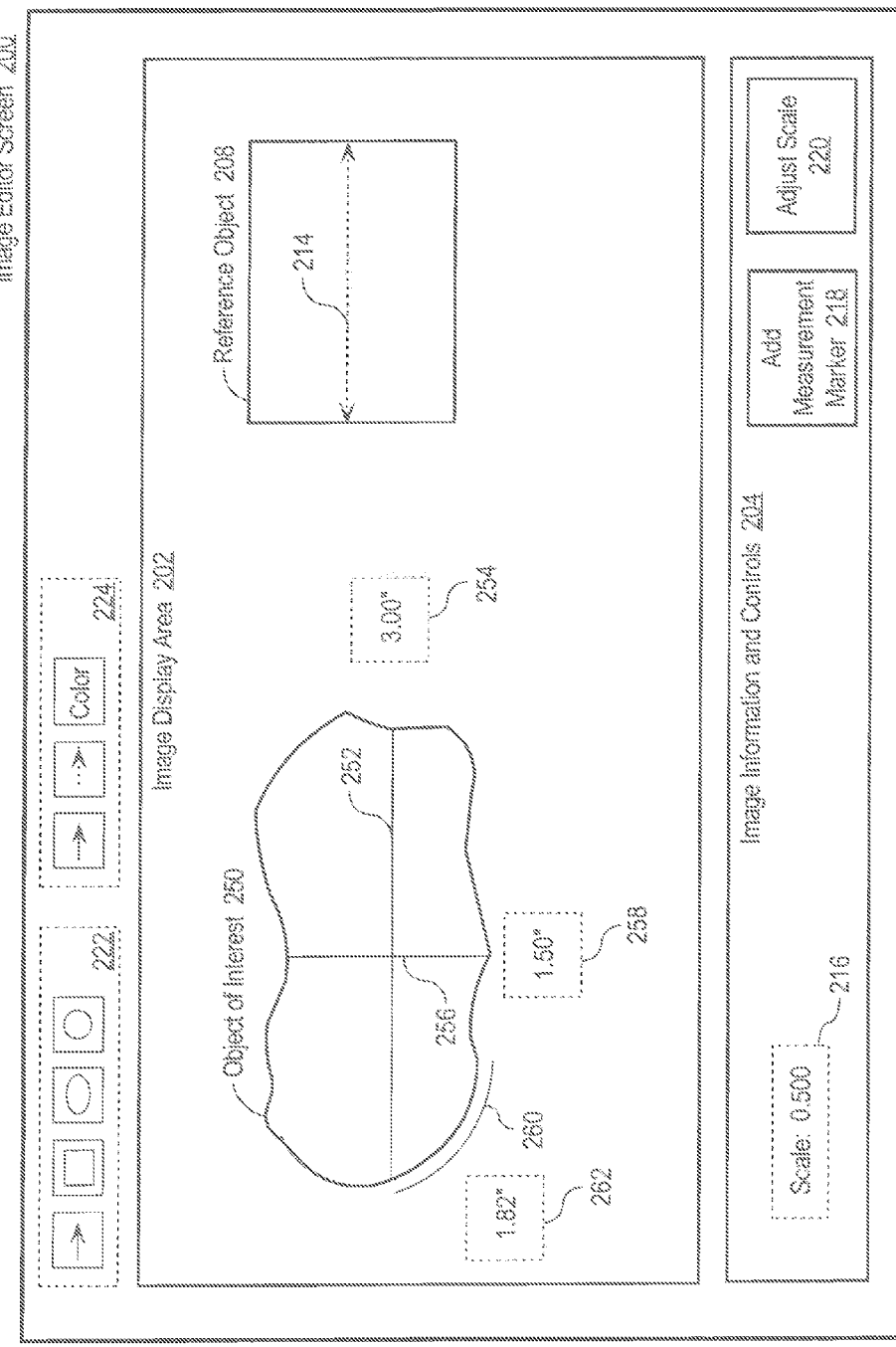
FIG. 2F depicts an object of interest that has a non-uniform shape.

Measurement markers may be helpful for measuring objects of interest of any shape. FIG. 2F depicts an object of interest 250 that has a non-uniform shape. Horizontal and vertical measurement markers 252, 254 have been created and overlaid onto object of interest 252. Measurement markers have calculated actual sizes 252, 256, respectively. A measurement marker 260 in the form of an arc has also been created and overlaid adjacent to a portion of the periphery of object of interest 250. Measurement marker 260 has a calculated actual size 262. Measurement marker 260 may be useful when a user is interested in the size of a particular portion of object of interest 250, such as the lower left corner as depicted in FIG. 2F.

Figure 2G:
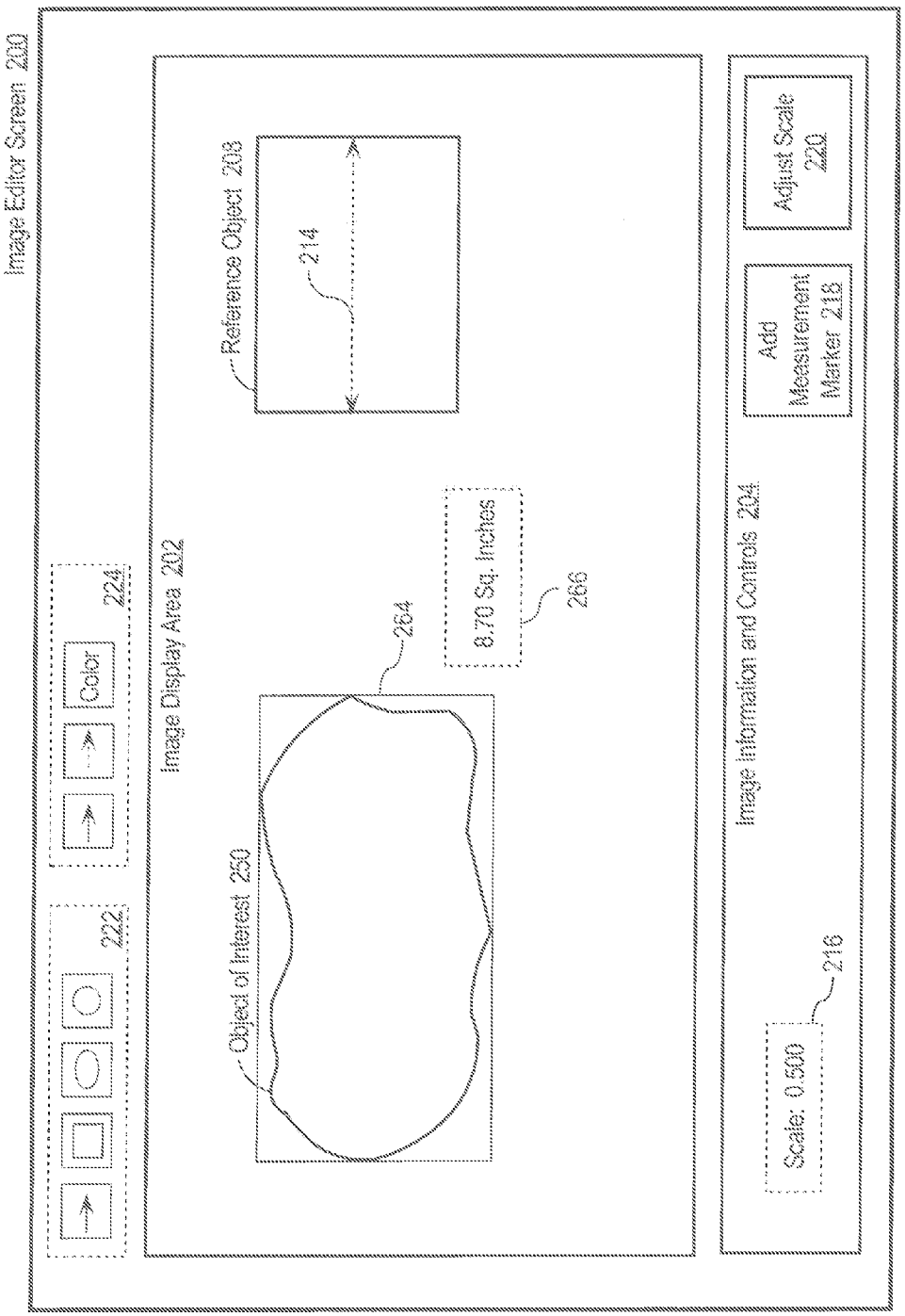
FIG. 2G depicts an object of interest and a measurement marker, in the form of a rectangle, which has been created and overlaid onto the object of interest.

According to one embodiment, measurement markers may be used to measure area of an object of interest. FIG. 2G depicts the object of interest 250 and a measurement marker 264, in the form of a rectangle, which has been created and overlaid onto the object of interest 250. A calculated actual area 266 of the measurement marker 264 in the scene is displayed on the image editor screen 200. The use of various shapes, such as polygons, circles, ovals, irregular shapes, custom shapes, etc., allows a user to be informed of the area of an object of interest, which may be particularly valuable for monitoring changes in size of objects of interest over time. The calculated actual area 266 of the measurement marker 264 in the scene may be calculated based upon:

(3) Calculated actual area of measurement marker in scene=(display area of measurement marker*actual size of reference object in the scene)/display size of reference object or (4) Calculated actual area of measurement marker in scene=display area of measurement marker/scale of reference object As previously described here with respect to measurement markers in the form of line segments, the calculated actual area 266 of the measurement marker 264 in the scene may be immediately calculated after measurement marker 264 is created and then dynamically updated in response to any changes to the size of measurement marker 264. Determining the calculated actual area 266 of the measurement marker 264 in a scene may be very useful in a variety of contexts. For example, in the healthcare context, the approach may be used to quickly and easily monitor the area of a wound site over time to determine healing progress.

FIG. 3 is a flow diagram 300 that depicts an approach for measuring objects in images, according to an embodiment. In step 302, image data is retrieved for an image of a scene that includes an object of interest and a reference object. For example, image editor 104 retrieves, from image repository 106, image data for a particular image that includes the object of interest 206 and the reference object 208. At least one dimension of the reference object 208 is known, for example, by metadata for the image data or by decoding encoded data contained in the particular image. In step 304, the image of the scene is displayed in an image editor. For example, image editor 104 causes the particular image to be displayed in image display area 202.

In step 306, a user uses an image editor to overlay a measurement marker on the object of interest. For example, a user of image editor 104 creates the measurement marker 226, which is overlaid onto the object of interest 206. In step 308, a determination is made of the display size, in the image editor, of the at least one dimension of the reference object. For example, the image editor 104 may automatically determine the display size of the at least one dimension of the reference object 208. In step 310, a determination is made of the display size, in the image editor, of at least one dimension of the measurement marker that was created by the user and overlaid onto the object of interest. For example, the image editor 104 may automatically determine the display size of at least one dimension of the measurement marker 226 that was overlaid onto the object of interest 206.

In step 312, an actual size in the scene of the at least one dimension of the measurement marker is determined. For example, as previously described herein, the image editor 104 may determine the actual size in the scene of the measurement marker 226 that was overlaid onto the object of interest 206 based upon the display size in the image editor 104 of the length of the measurement marker 226, the display size in the image editor 104 of the width of the reference object 208 and the known actual width 214 in the scene of the reference object 208. In step 314, the determined actual size in the scene of the at least one dimension of the measurement marker is displayed. For example, image editor 104 may display the determined actual size 228 in the scene of the length of the measurement marker 226.

IV. Scale Adjustment

There may be situations where the scale of a reference object in an image is not accurate or less than ideal. This may occur for a wide variety of reasons. For example, suppose that in FIG. 2B, the specialized ruler 210 that includes the reference object 208 is printed on a flexible media, such as paper, card stock, etc., and the surface on which the specialized ruler 210 is uneven or not perfectly flat. This situation may result in a distortion of the reference object 208 in the image, which in turn may cause an incorrect determination of the display size of the reference object 208 and also the current scale.

Figure 2H:
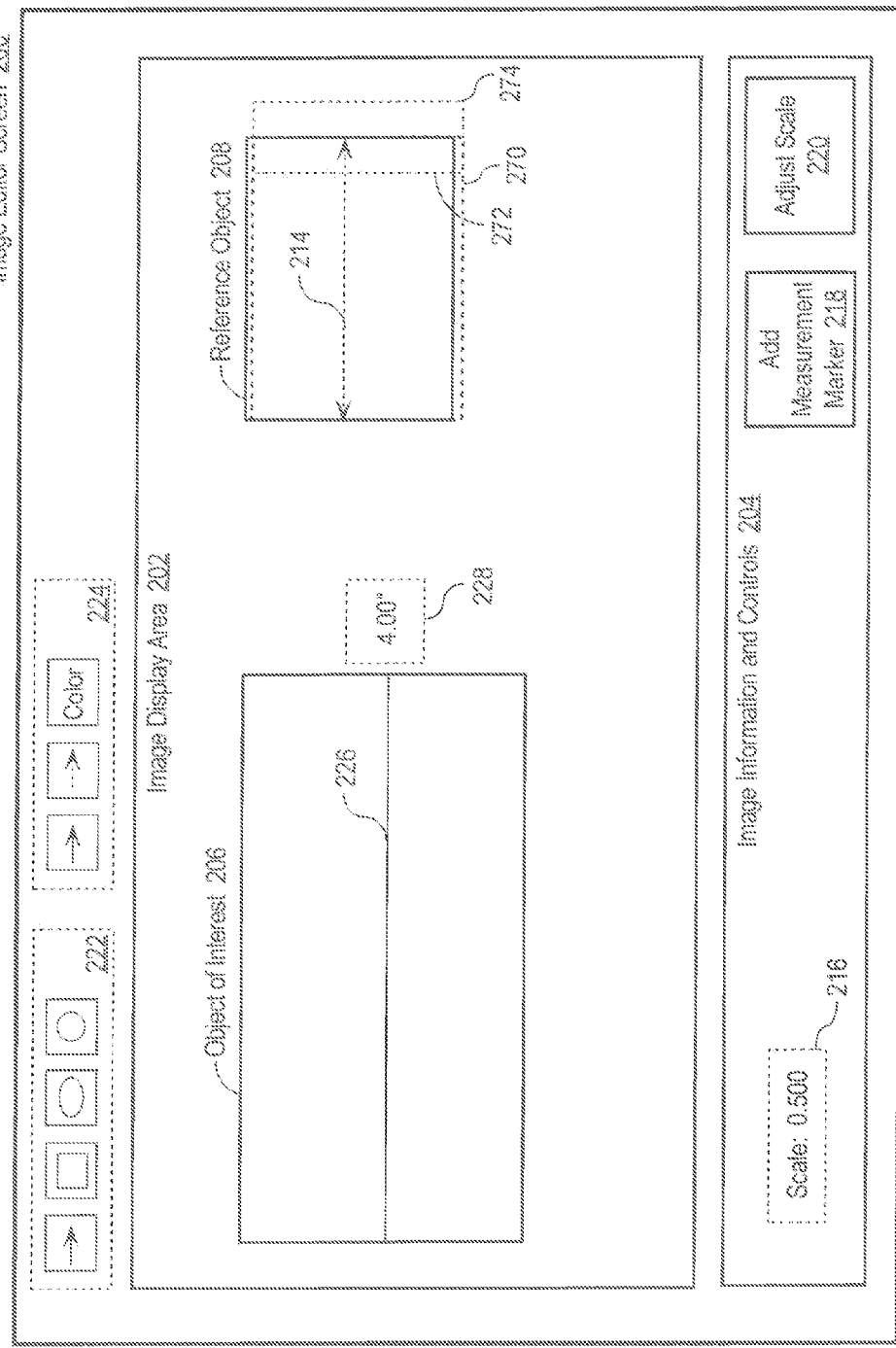
FIG. 2H depicts a scale marker that has been created and displayed over a reference object in response to a user selection of an adjust scale control.

According to one embodiment, image editor 104 allows a user to change the scale of a reference object. FIG. 2H depicts a scale marker 270 that has been created and displayed over the reference object 208 in response to a user selection of the adjust scale 220 control. Scale marker 270 may be any graphical user interface object, or any combination of graphical user interface objects, that provides a visual representation of the at least one dimension of the reference object. In the example depicted in FIG. 2H, the scale marker 270 is in the form of a dashed rectangle to visually indicate the display width of reference object 208. In addition, the dashed rectangle is intentionally offset from the reference object 208 to make the presence of the scale marker 270 conspicuous to a user in response to the user's selection of the adjust scale 220 control. The visual appearance of the scale marker 270 including, for example, shape, size, etc., may be selected to correspond to the visual appearance of the reference object 208. For example, where the reference object 208 is in the form of a barcode, the scale marker 270 may also have the visual appearance of a barcode to correspond to the reference object 208. This is not required, however, and the visual appearance of the scale marker 270 may differ from the visual appearance of the reference object 208, depending upon a particular implementation.

According to one embodiment, a user may adjust the scale marker 270 to cause a corresponding change to the display size of the at least one dimension of the reference object and a corresponding change to the scale of the reference object. For example, in FIG. 2H, a user may use a pointing device, such as a mouse, to select and change the width of the scale marker 270. More specifically, a user may narrow the scale marker 270 as indicated by reference numeral 272, or widen the scale marker 270, as indicated by reference numeral 274. Adjustments to other dimensions of the scale marker 270 may be constrained or not constrained, depending upon a particular implementation. For example, the height of the scale marker 270 may be fixed, or may be adjustable by the user. Separate graphical user interface controls may be provided to allow a user to adjust the scale marker 270, as an alternative to, or in addition to allowing a user to directly change the at least one dimension of the scale marker 270. For example, increment and decrement controls may be provided to increase and decrease, respectively, the width of the scale marker 270. Although examples are described herein in the context of changing a single display dimension of a reference object, embodiments are not limited to a single dimension and multiple dimensions may be changed using the approach.

In addition to the foregoing, the image editor 104 may be configured to provide additional functionality. One such example is white point adjustment. According to one embodiment, image editor 104 is configured to provide one or more graphical user interface controls that allow a user to change the white point adjustment of the object of interest, which in turn may allow a user to better discern features of interest in the object of interest. For example, in response to a user selection of a graphical user interface object that corresponds to white point adjustment, a white point or grey point marker may be displayed in image display area 202, for example adjacent the object of interest 206. The white point or grey point marker may be in the form of a rectangle or circle and have a "perfect white" or "perfect grey" color. The user may then use controls within image editor 104 to adjust the white point of the image. Similar approaches may be used for black point adjustment, contrast, etc. White point or grey point markers may also be included on the specialized ruler 210, previously described herein.

Embodiments described herein provide a user-friendly, e.g., "single click" and fast, method of measuring the actual size in a scene, in at least one dimension, of objects of interest in an image. Embodiments have broad applicability to a wide variety of contexts. Example contexts include, without limitation, the healthcare field, the construction field, insurance claim field, the meteorology field, the geology field, or any other context where it is valuable to be able to quickly and easily measure objects of interest in images.

Although embodiments are described herein and depicted in the figures in the context of measuring objects in two-dimensional images of scenes using measurement markers, embodiments are not limited to this context and are applicable to the three-dimensional context. For example, in the embodiments described herein, an image may be a two-dimensional raster image specified in a JPG file, or other formats, such as TIFF and PBG. An image may also be in a three-dimensional format (STL, OBJ, PLY, VRML, etc.), where a plane through three-dimensional space is measured. The plane may be measured in one dimension, two dimensions (area), three dimensions (volume), or any combination thereof. Images may also be represented in compound document formats, such as PDF.

Part of the problem that is being addressed is that the underlying camera/photo optics & light sensors are separate from a 2D/3D distance sensor(s), so there is benefit provided by having a reference object in the image to establish a correlation between the scale of the captured image and the distance sensor data. A distance sensor can determine the distance from the sensor to an object, but there are many factors that control how a scene is captured in an image and the scale factor of the captured image, such as the focal length of the lens, optical macro/zoom, and digital macro/zoom. Utilizing a reference object in the scene allows the distance data from a 2D/3D distance sensor to be correlated with the scale of the captured image data and also enables a 2D/3D distance sensor to be used with a wide variety of cameras and lenses without any modification to the camera or distance sensor.

IV. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
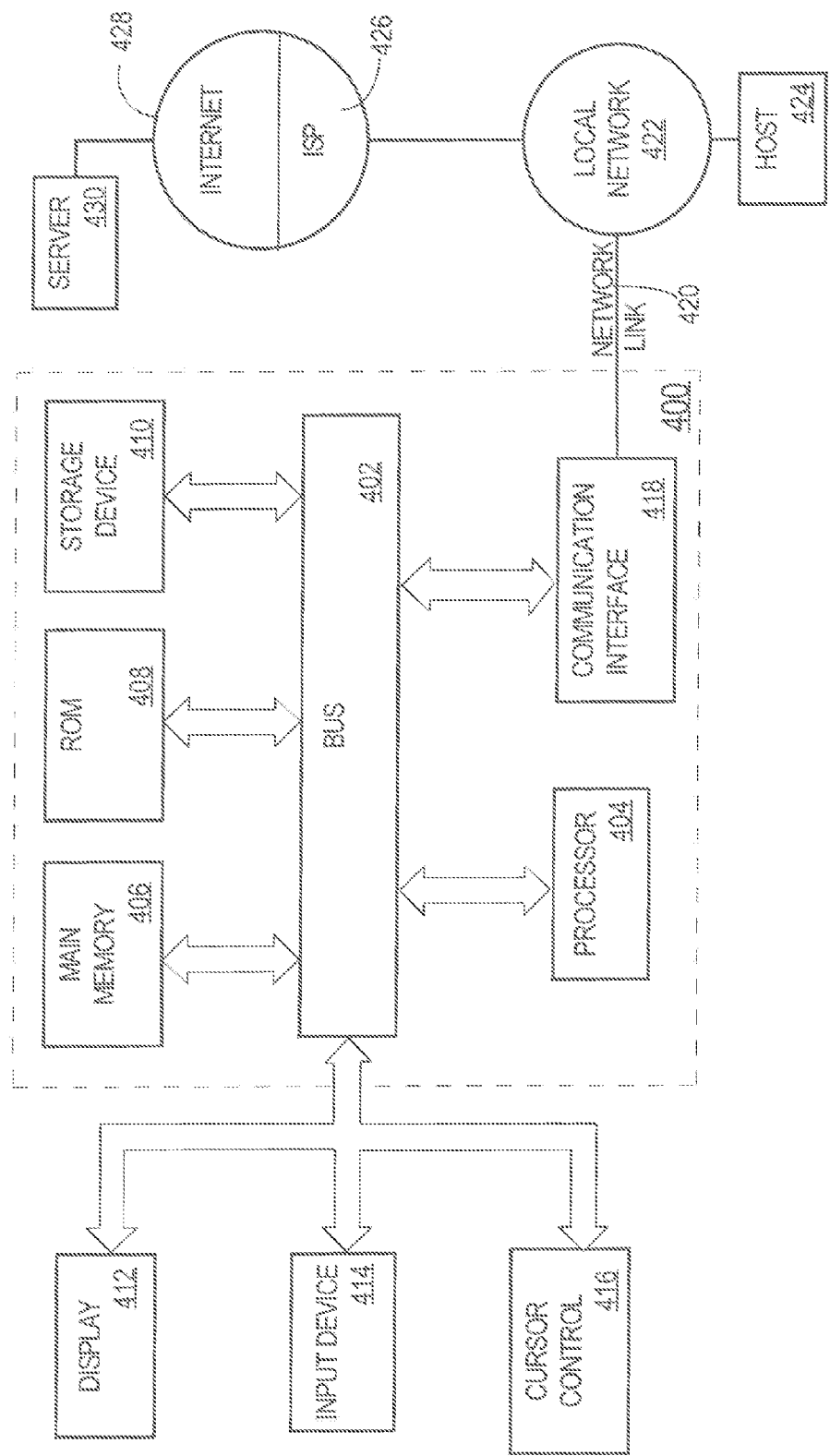
FIG. 4 is a block diagram that depicts an example computer system upon which embodiments may be implemented.

FIG. 4 is a block diagram that depicts an example computer system 400 upon which embodiments may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. Although bus 402 is illustrated as a single bus, bus 402 may comprise one or more buses. For example, bus 402 may include without limitation a control bus by which processor 404 controls other devices within computer system 400, an address bus by which processor 404 specifies memory locations of instructions for execution, or any other type of bus for transferring data or signals between components of computer system 400.

An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic or computer software which, in combination with the computer system, causes or programs computer system 400 to be a special-purpose machine. According to one embodiment, those techniques are performed by computer system 400 in response to processor 404 processing instructions stored in main memory 406. Such instructions may be read into main memory 406 from another computer-readable medium, such as storage device 410. Processing of the instructions contained in main memory 406 by processor 404 causes performance of the functionality described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 400, various computer-readable media are involved, for example, in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406. Common forms of computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of computer-readable media may be involved in storing instructions for processing by processor 404. For example, the instructions may initially be stored on a storage medium of a remote computer and transmitted to computer system 400 via one or more communications links. Bus 402 carries the data to main memory 406, from which processor 404 retrieves and processes the instructions. The instructions received by main memory 406 may optionally be stored on storage device 410 either before or after processing by processor 404.

Computer system 400 also includes a communication interface 418 coupled to bus 402. Communication interface 418 provides a communications coupling to a network link 420 that is connected to a local network 422. For example, communication interface 418 may be a modem to provide a data communication connection to a telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be processed by processor 404 as it is received, and/or stored in storage device 410, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions which, when processed by one or more processors, cause:
   retrieving image data for an image of a scene that includes an object of interest and a reference object having a known actual size in the scene in at least one dimension, wherein the known actual size in the at least one dimension of the scene of the reference object is in encoded data that is included in the image data;
   causing the image of the scene that includes the object of interest and the reference object having a known actual size in the scene in at least one dimension to be displayed in an image editor executing on one or more computing devices;
   in response to user input, overlaying a measurement marker on the object of interest in the image editor;
   determining a display size in the image editor of the at least one dimension of the reference object;
   determining a display size in the image editor of at least one dimension of the measurement marker;
   determining an actual size of the at least one dimension of the measurement marker in the scene based upon the display size in the image editor of at least one dimension of the measurement marker, the display size in the image editor of the at least one dimension of the reference object and the known actual size in the at least one dimension of the reference object in the scene; and
   displaying, in the image editor, the determined actual size of the at least one dimension of the measurement marker in the scene.

2. The one or more non-transitory computer-readable media of claim 1, wherein the measurement marker is one or more of one or more line segments, one or more rectangles, one or more circular shapes, or one or more other shapes.

3. The one or more non-transitory computer-readable media of claim 1, wherein the encoded data that is included in the image data is in the form of one or more barcodes.

4. The one or more non-transitory computer-readable media of claim 1, further comprising additional instructions which, when processed by the one or more processors, cause detecting the presence of the reference object in the image of the scene based upon one or more unique characteristics of the reference object.

5. The one or more non-transitory computer-readable media of claim 4, wherein the reference object is a barcode and detecting the presence of the reference object in the image of the scene based upon one or more unique characteristics of the reference object includes detecting the presence of the barcode in the image of the scene.

6. The one or more non-transitory computer-readable media of claim 4, further comprising additional instructions which, when processed by the one or more processors, cause displaying information in the image editor that visually indicates the reference object to a user of the image editor.

7. The one or more non-transitory computer-readable media of claim 1, further comprising additional instructions which, when processed by the one or more processors, cause:
   determining a scaling factor based upon the display size in the image editor of the at least one dimension of the reference object and the known actual size in the at least one dimension of the reference object in the scene; and
   displaying the scaling factor in the image editor.

8. The one or more non-transitory computer-readable media of claim 1, further comprising additional instructions which, when processed by the one or more processors, cause:
   displaying in the image editor one or more graphical user interface objects that allow a user to change the display size in the image editor of the at least one dimension of the reference object;
   in response to a user selection of the one or more graphical user interface objects that causes a change to the display size in the image editor of the at least one dimension of the reference object:
   determining a revised scaling factor based upon the changed display size in the image editor of the at least one dimension of the reference object and the known actual size in the at least one dimension of the reference object in the scene; and
   displaying the revised scaling factor in the image editor.

9. The one or more non-transitory computer-readable media of claim 1, further comprising additional instructions which, when processed by the one or more processors, cause transmitting to a content management system, data that specifies the determined actual size of the at least one dimension of the measurement marker in the scene.

10. The one or more non-transitory computer-readable media of claim 1, wherein the one or more instructions are embodied in one or more Web pages.

11. An apparatus comprising:
    one or more processors; and
    one or more memories storing instructions which, when processed by one or more processors, cause:
    retrieving image data for an image of a scene that includes an object of interest and a reference object having a known actual size in the scene in at least one dimension, wherein the known actual size in the at least one dimension of the scene of the reference object is in encoded data that is included in the image data;
    causing the image of the scene that includes the object of interest and the reference object having a known actual size in the scene in at least one dimension to be displayed in an image editor executing on one or more computing devices;
    in response to user input, overlaying a measurement marker on the object of interest in the image editor;
    determining a display size in the image editor of the at least one dimension of the reference object;

determining a display size in the image editor of at least one dimension of the measurement marker;

determining an actual size of the at least one dimension of the measurement marker in the scene based upon the display size in the image editor of at least one dimension of the measurement marker, the display size in the image editor of the at least one dimension of the reference object and the known actual size in the at least one dimension of the reference object in the scene; and displaying, in the image editor, the determined actual size of the at least one dimension of the measurement marker in the scene.

12. The apparatus of claim 11, wherein the measurement marker is one or more of one or more line segments, one or more rectangles, one or more circular shapes, or one or more other shapes.

13. The apparatus of claim 11, wherein the encoded data that is included in the image data is in the form of one or more barcodes.

14. The apparatus of claim 11, wherein the one or more memories further store additional instructions which, when processed by the one or more processors, cause detecting the presence of the reference object in the image of the scene based upon one or more unique characteristics of the reference object.

15. The apparatus of claim 14, wherein the reference object is a barcode and detecting the presence of the reference object in the image of the scene based upon one or more unique characteristics of the reference object includes detecting the presence of the barcode in the image of the scene.

16. The apparatus of claim 14, wherein the one or more memories further store additional instructions which, when processed by the one or more processors, cause displaying information in the image editor that visually indicates the reference object to a user of the image editor.

17. The apparatus of claim 11, wherein the one or more memories further store additional instructions which, when processed by the one or more processors, cause:

determining a scaling factor based upon the display size in the image editor of the at least one dimension of the reference object and the known actual size in the at least one dimension of the reference object in the scene; and displaying the scaling factor in the image editor.

18. The apparatus of claim 11, wherein the one or more memories further store additional instructions which, when processed by the one or more processors, cause:

displaying in the image editor one or more graphical user interface objects that allow a user to change the display size in the image editor of the at least one dimension of the reference object;

in response to a user selection of the one or more graphical user interface objects that causes a change to the display size in the image editor of the at least one dimension of the reference object:

determining a revised scaling factor based upon the changed display size in the image editor of the at least one dimension of the reference object and the known actual size in the at least one dimension of the reference object in the scene; and displaying the revised scaling factor in the image editor.

19. The apparatus of claim 11, further comprising transmitting to a content management system, data that specifies the determined actual size of the at least one dimension of the measurement marker in the scene.

20. A method comprising:

retrieving image data for an image of a scene that includes an object of interest and a reference object having a known actual size in the scene in at least one dimension, wherein the known actual size in the at least one dimension of the scene of the reference object is in encoded data that is included in the image data;

causing the image of the scene that includes the object of interest and the reference object having a known actual size in the scene in at least one dimension to be displayed in an image editor executing on one or more computing devices;

in response to user input, overlaying a measurement marker on the object of interest in the image editor; and determining a display size in the image editor of the at least one dimension of the reference object;

determining a display size in the image editor of at least one dimension of the measurement marker;

determining an actual size of the at least one dimension of the measurement marker in the scene based upon the display size in the image editor of at least one dimension of the measurement marker, the display size in the image editor of the at least one dimension of the reference object and the known actual size in the at least one dimension of the reference object in the scene; and displaying, in the image editor, the determined actual size of the at least one dimension of the measurement marker in the scene.

* * * * *